United States Patent [19]

Hunt

[11] 4,316,013

[45] Feb. 16, 1982

[54] SUBSTITUTED HETEROCYCLIC METHINE DYES

[75] Inventor: Keith Hunt, Maghull, England

[73] Assignee: Eastman Kodak Company, Rochester, N.Y.

[21] Appl. No.: 182,520

[22] Filed: Aug. 29, 1980

[30] Foreign Application Priority Data

May 16, 1980 [GB] United Kingdom ............... 16214/80

[51] Int. Cl.$^3$ .................. C07D 403/10; C07D 263/54
[52] U.S. Cl. .................................. 542/445; 542/429; 542/430; 542/431; 542/434; 542/435; 542/455; 542/457; 542/458
[58] Field of Search ............ 542/429, 434, 457, 430, 542/431, 435, 455, 458, 445

[56] References Cited

U.S. PATENT DOCUMENTS

| | | | |
|---|---|---|---|
| 2,850,520 | 9/1958 | Bottmingen | 542/457 |
| 2,953,561 | 9/1960 | Doorenbos et al. | 542/457 |
| 3,157,663 | 11/1964 | Bencze | 542/457 |
| 3,890,364 | 6/1975 | Knupfer et al. | 542/457 |
| 3,917,604 | 11/1975 | Hoyle | 544/105 |
| 3,920,720 | 11/1975 | Beecken | 542/438 |
| 3,969,346 | 7/1976 | Koller et al. | 542/457 |
| 4,077,962 | 3/1978 | Beecken | 544/105 |

OTHER PUBLICATIONS

Kato et al., Chemical Abstracts 70 (1969) #106329z.

*Primary Examiner*—Arthur P. Demers
*Attorney, Agent, or Firm*—Donald W. Spurrell; Daniel B. Reece, III

[57] ABSTRACT

Disclosed are disperse dyes for the dyeing of synthetic fibers such as cellulose acetate, triacetate, polyamide and especially polyester and its blends, which have the general formula

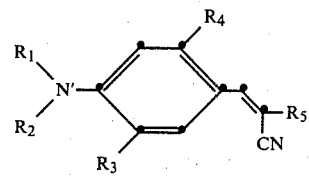

in which $R_1$ and $R_2$ may be the same or different and are selected, for example, from hydrogen, aryl, benzyl, cyclohexyl, and $C_1$–$C_6$ alkyl optionally substituted by Cl, CN, $OC_2H_4OC_2H_5$, $C_1$–$C_4$ alkoxy, aryl,

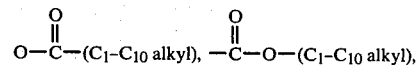

NHCONHPh, OCONHPh, phthalimido, succinimido or mercaptobenzthiazolyl, and $R_1$ and $R_2$ may form a 5- or 6-membered ring with the

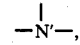

which ring may or may not contain a S, N, or O atom; $R_3$ is H, Cl, Br, $C_1$–$C_4$ alkyl or $C_1$–$C_4$ alkoxy; $R_2$ and $R_3$ may form a 5 or 6 membered ring preferably substituted by 1–3 methyl groups; $R_4$ is H, Cl, Br, $C_1$–$C_4$ alkyl or $C_1$–$C_4$ alkoxy; and $R_5$ is selected from 3-pyridyl, 3-benzisothiazolyl, 2-benzothiazolyl, 2-benzoxazolyl, 2-quinoxalyl, 2-quinazolinonyl, 2-1,3,4-oxadiazolyl, 2-1,3,4-thiadiazolyl and 2-thienyl, which $R_5$ heterocycles may be substituted by Cl, Br, $NO_2$, CN, aryl, aryl substituted by Cl, Br, $NO_2$ or CN, $C_1$–$C_4$ alkyl or $COOR_6$ wherein $R_6$ is $C_1$–$C_4$ alkyl or aryl.

6 Claims, No Drawings

SUBSTITUTED HETEROCYCLIC METHINE DYES

This invention relates to disperse dyes for the dyeing of synthetic fibers such as cellulose acetate, triacetate, polyamide and especially polyester and its blends, which have the general formula

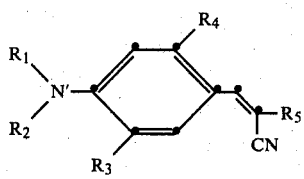

in which $R_1$ and $R_2$ may be the same or different and are selected from hydrogen, aryl, benzyl, cyclohexyl, and $C_1$–$C_6$ alkyl which may be substituted by Cl, CN, $OC_2H_4OC_2H_5$, $C_1$–$C_4$ alkoxy, aryl,

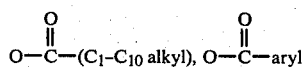

(in which the aryl, and the $C_1$–$C_{10}$ alkyl of the preceding substituent, may be substituted by Cl, Br, CN, $NO_2$, CO—alkyl, CO—aryl, alkoxy, aryloxy, CO—O—alkyl or CO—O—aryl),

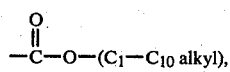

NHCONHPh, OCONHPh, phthalimido, succinimido or mercaptobenzthiazolyl, and $R_1$ and $R_2$ may form a 5- or 6-membered ring with the

which ring may or may not contain a S, N, or O atom; $R_3$ is H, Cl, Br, $C_1$–$C_4$ alkyl or $C_1$–$C_4$ alkoxy; $R_2$ and $R_3$ may form a 5 or 6 membered ring preferably substituted by 1–3 methyl groups; $R_4$ is H, Cl, Br, $C_1$–$C_4$ alkyl or $C_1$–$C_4$ alkoxy; and $R_5$ is selected from 3-pyridyl, 3-benzisothiazolyl, 2-benzothiazolyl, 2-benzoxazolyl, 2-quinoxalyl, 2-quinazolinonyl, 2-1,3,4-oxadiazolyl, 2-1,3,4-thiadiazolyl and 2-thienyl, which $R_5$ heterocycles may be substituted by Cl, Br, $NO_2$, CN, aryl, aryl substituted by Cl, Br, $NO_2$ or CN, $C_1$–$C_4$ alkyl or $COOR_6$ wherein $R_6$ is $C_1$–$C_4$ alkyl or aryl.

The dyes produce yellow to scarlet shades on hydrophobic textile fiber including polyesters, polyamides and cellulose esters and show unexpected improvements in one or more of such properties as fastness to light, wash, ozone, gas such as oxides of nitrogen, perspiration, crock, sublimation, dyeability at unusually low energy levels to deep shades and exhibit excellent build, pH stability, bloom resistance, leveling, migration, dye bath exhaustion, dye transfer, heat stability on polyamide and the like, over such prior art as disclosed in U.S. Pat. Nos. 4,077,962; 4,016,191; 4,006,178; 3,917,604; 3,240,783; 3,247,211; 3,595,863; 3,453,280; 2,766,233; 2,850,520; and Japanese J7-4023-806.

The dyeing of the fiber with the dyestuffs according to the invention is appropriately carried out from an aqueous suspension in the presence of carriers between 80° and 100° C., in the absence of carriers at between 100°–130° C., or using the so-called thermofixing process at 180°–230° C. The printing of the materials can be carried out by steaming the goods, printed with the new dyestuffs, in the presence of a carrier at temperatures between 80° and 110° C., or in the absence of a carrier at 110°–140° C., or also by treating the goods which have been printed with the new dyestuffs, according to the thermofixing process at 180°–230° C.

This invention will be further illustrated by the following examples although it will be understood that these examples are included merely for purposes of illustration and are not intended to limit the scope of the invention.

EXAMPLE 1

4-Formyl N-ethyl-N-(β-cyanoethyl) aniline (0.404 g, 0.002 mole) was dissolved in ethyl alcohol (10 ml). To this was added 5-chloro-benzoxazolyl-2-acetonitrile (0.385 g, 0.002 mole) and piperidine (0.1 ml) and the mixture was warmed on a steam bath for 15 min. After cooling overnight the orange crystalline product was collected by filtration and air dried. The dye was ball milled in the presence of a lignin sulphonate dispersing agent for 24 hours and the resulting dispersion was applied to polyester fiber by dyeing at 130° for 1 hour. It gave a deep yellow dyeing of excellent color strength and fastness to light. Similar dyeings prepared in dyebaths buffered from pH 4–8 also gave high strength dyeings indicating the dye had excellent pH stability.

EXAMPLE 2

4-Formyl N-ethyl N-(2'-phthalimidoethyl) m-toluidine (1.68 g., 0.005 g. mole) was dissolved in ethyl alcohol (40 ml). To this was added 2-quinoxalyl acetonitrile (0.85 g., 0.005 g. mole) with stirring, and piperidine (0.2 ml) was added and the mixture left at room temperature overnight. The orange crystalline product was collected by filtration, washed with a little cold ethanol and dried. The dye was ball milled in the presence of a lignin sulphonate dispersing agent for 24 hours and the resulting dispersion was applied to polyester fibre by dyeing at 130° for 1 hour. It gave a deep yellow dyeing of excellent color strength and fastness to light. Similar dyeings prepared in dyebaths buffered from pH 4–8 also gave high strength dyeings indicating the dye had excellent pH stability.

By application of the synthetic procedures outlined in Example 1, the following dyes were prepared. When applied by a procedure similar to the above dyeing description they give high strength dyeings on polyester textile fibers.

Methine Dyestuffs of the Formula

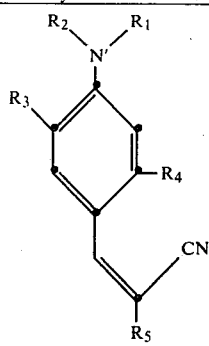

| Example | R₁ | R₂ | R₃ | R₄ | R₅ |
|---|---|---|---|---|---|
| 3 | C₂H₄CN | C₂H₅ | H | CH₃ | 5-chloro-benzoxazolyl |
| 4 | C₂H₄—N(phthalimido) | C₂H₅ | H | CH₃ | 5-chloro-benzoxazolyl |
| 5 | C₂H₄O—COC₄H₉ | C₂H₅ | Br | CH₃ | 5-chloro-benzoxazolyl |
| 6 | C₂H₄NHCONHPh | C₂H₅ | H | CH₃ | 5-cyano-benzoxazolyl |
| 7 | C₂H₄N(succinimido) | C₂H₅ | H | CH₃ | 5-cyano-benzoxazolyl |
| 8 | Ph | CH₂Ph | H | H | 5-bromo-benzoxazolyl |
| 9 | C₂H₄CN | C₂H₅ | H | H | 5-nitro-benzoxazolyl |
| 10 | C₂H₄CN | C₂H₅ | H | CH₃ | 5-nitro-benzoxazolyl |
| 11 | C₂H₅ | C₂H₅ | CH₃ | OCH₃ | 5-nitro-benzoxazolyl |
| 12 | C₂H₄Cl | C₂H₄OC₂H₅ | CH₃ | OCH₃ | 5-nitro-benzoxazolyl |
| 13 | CH₂Ph | C₂H₄OC₂H₅ | Cl | Cl | 5-nitro-benzoxazolyl |
| 14 | C₂H₄O—COC₃H₇ | C₃H₇ | H | H | 5-cyano-benzoxazolyl |
| 15 | C₂H₄—COC₄H₉ | C₃H₇ | H | Br | 5-cyano-benzoxazolyl |
| 16 | CH₂C₆H₅ | C₂H₄Cl | H | H | 5-methyl-benzoxazolyl |
| 17 | CH₂C₆H₅ | CH₂C₆H₅ | CH₃ | CH₃ | 5-COOCH₃—benzoxazolyl |
| 18 | C₂H₄OCONHPh | CH₃ | CH₃ | CH₃ | 5-COOCH₃—benzoxazolyl |
| 19 | C₂H₄—N(phthalimido) | C₂H₅ | H | CH₃ | 5-nitro-benzoxazolyl |
| 20 | C₆H₁₁ | C₂H₄CN | H | CH₃ | 5-nitro-benzoxazolyl |
| 21 | C₂H₄NHCONHPh | C₂H₅ | H | CH₃ | 5-nitro-benzoxazolyl |
| 22 | C₂H₄Ph | C₂H₅ | OC₂H₅ | OC₂H₅ | 5-nitro-benzoxazolyl |
| 23 | H | C₂H₅ | H | CH₃ | 5-chloro-benzothiazolyl |

-continued

Methine Dyestuffs of the Formula

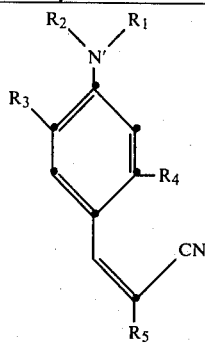

| Example | $R_1$ | $R_2$ | $R_3$ | $R_4$ | $R_5$ |
|---|---|---|---|---|---|
| 24 | $C_2H_4$–N(phthalimido) | $C_2H_5$ | H | $CH_3$ | 5-chloro-benzothiazolyl |
| 25 | –N'(piperidino) | | H | $CH_3$ | 5-chloro-benzothiazolyl |
| 26 | $C_2H_4NHCONHPh$ | $C_2H_5$ | H | $CH_3$ | 5-chloro-benzothiazolyl |
| 27 | $C_2H_4$–N(succinimido) | $C_2H_5$ | H | $CH_3$ | 5-chloro-benzothiazolyl |
| 28 | Ph | Ph | H | H | 5-chloro-benzothiazolyl |
| 29 | $C_2H_4CN$ | H | H | H | 5-nitro-benzothiazolyl |
| 30 | $C_2H_4CN$ | $C_2H_5$ | H | $CH_3$ | 5-nitro-benzothiazolyl |
| 31 | H | $C_2H_5$ | $CH_3$ | $OCH_3$ | 5-nitro-benzothiazolyl |
| 32 | $C_2H_4Cl$ | $C_2H_4OC_2H_4OC_2H_5$ | $CH_3$ | $OCH_3$ | 5-nitro-benzothiazolyl |
| 33 | " | $C_2H_4OC_2H_5$ | Cl | Cl | 5-nitro-benzothiazolyl |
| 34 | –N'–SO_2 (ring) | | H | H | 5-cyano-benzothiazolyl |
| 35 | –N'–O (morpholino) | | H | H | 5-cyano-benzothiazolyl |
| 36 | $C_6H_{11}$ | $C_2H_4CN$ | H | H | 5-methyl-benzothiazolyl |
| 37 | $CH_2$–$C_6H_5$ | $C_2H_5$ | $CH_3$ | $CH_3$ | 5-$COOCH_3$–benzothiazolyl |
| 38 | $C_2H_4OCONHPh$ | $CH_3$ | $CH_3$ | $CH_3$ | 5-$COOC_6H_5$–benzothiazolyl |
| 39 | $C_2H_4$–N(phthalimido) | $C_2H_5$ | H | $CH_3$ | 5-nitro-benzothiazolyl |
| 40 | $C_6H_{11}$ | $C_6H_{11}$ | H | $CH_3$ | 5-nitro-benzothiazolyl |
| 41 | $C_2H_4NHCONHPh$ | $C_2H_5$ | H | $CH_3$ | 5-nitro-benzothiazolyl |
| 42 | $C_2H_4Ph$ | $C_2H_5$ | $OC_2H_5$ | $OC_2H_5$ | 5-nitro-benzothiazolyl |

-continued

Methine Dyestuffs of the Formula

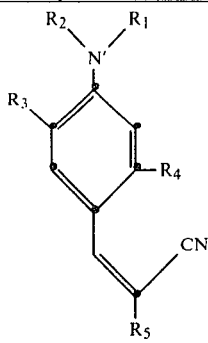

| Example | R₁ | R₂ | R₃ | R₄ | R₅ |
|---|---|---|---|---|---|
| 43 | $C_2H_4CN$ | $C_2H_5$ | H | $CH_3$ | 5-phenyl-1,3,4-oxadiazolyl |
| 44 | $C_2H_4$—N(phthalimido) | $C_2H_5$ | H | $CH_3$ | 5-phenyl-1,3,4-oxadiazolyl |
| 45 | $C_2H_4O$—C(=O)—$C_4H_9$ | $C_2H_5$ | H | $CH_3$ | 5-phenyl-1,3,4-oxadiazolyl |
| 46 | $C_2H_4NHCONHPh$ | $C_2H_5$ | H | $CH_3$ | 5-phenyl-1,3,4-oxadiazolyl |
| 47 | $C_2H_4$—N(succinimido) | $C_2H_5$ | H | $CH_3$ | 5-phenyl-1,3,4-oxadiazolyl |
| 48 | Ph | Ph | H | H | 5-phenyl-1,3,4-oxadiazolyl |
| 49 | $C_2H_4CN$ | $C_2H_5$ | H | H | 5-phenyl-1,3,4-oxadiazolyl |
| 50 | $C_2H_4CN$ | $C_2H_5$ | H | $CH_3$ | 5-phenyl-1,3,4-oxadiazolyl |
| 51 | $C_2H_4Cl$ | $C_2H_5$ | $CH_3$ | $OCH_3$ | 5-phenyl-1,3,4-oxadiazolyl |
| 52 | $C_2H_4Cl$ | $C_2H_4OC_2H_5$ | $CH_3$ | $OCH_3$ | 5-phenyl-1,3,4-oxadiazolyl |
| 53 | $C_2H_4C$(=O)—$OC_4H_9$ | $C_2H_4OC_2H_5$ | Cl | Cl | 5-phenyl-1,3,4-oxadiazolyl |
| 54 | $C_2H_4C$(=O)—$OC_4H_9$ | $C_3H_7$ | H | H | 5-phenyl-1,3,4-oxadiazolyl |
| 55 | —N'(thiomorpholine-S,S-dioxide) | | H | H | 5-phenyl-1,3,4-oxadiazolyl |
| 56 | —N'(morpholino) | | H | H | 5-phenyl-1,3,4-oxadiazolyl |
| 57 | —N'(piperazino) | | $CH_3$ | $CH_3$ | 5-phenyl-1,3,4-oxadiazolyl |
| 58 | $C_2H_4OCONHPh$ | $CH_3$ | $CH_3$ | $CH_3$ | 5-phenyl-1,3,4-oxadiazolyl |
| 59 | $C_2H_4$—N(phthalimido) | $C_2H_5$ | H | $CH_3$ | 5-phenyl-1,3,4-oxadiazolyl |
| 60 | $CH_2C_6H_5$ | $C_2H_5$ | H | $CH_3$ | 5-phenyl-1,3,4- |

-continued

Methine Dyestuffs of the Formula

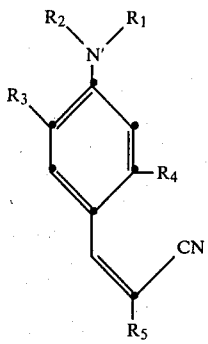

| Example | R₁ | R₂ | R₃ | R₄ | R₅ |
|---|---|---|---|---|---|
| 61 | C₂H₄NHCONHPh | C₂H₅ | H | CH₃ | 5-phenyl-1,3,4-oxadiazolyl |
| 62 | C₂H₄Ph | C₂H₅ | OC₂H₅ | OC₂H₅ | 5-phenyl-1,3,4-oxadiazolyl |
| 63 | C₂H₄O—C(O)Ph | C₂H₅ | H | H | 5-chloro-benzoxazolyl |
| 64 | " | C₂H₅ | H | CH₃ | 5-chloro-benzoxazolyl |
| 65 | " | CH₂Ph | H | CH₃ | 5-chloro-benzoxazolyl |
| 66 | " | C₄H₉ | H | CH₃ | benzothiazolyl |
| 67 | C₂H₄O—C(O)C₂H₄OC₂H₅ | C₂H₅ | H | CH₃ | 5-chloro-benzoxazolyl |
| 68 | " | C₂H₅ | H | H | benzothiazolyl |
| 69 | " | C₂H₄CN | H | H | " |
| 70 | C₂H₄O—C(O)C₃H₇ | C₂H₅ | H | CH₃ | " |
| 71 | C₂H₄O—C(O)C₃H₆Cl | C₂H₄CN | H | H | 5-chloro-benzoxazolyl |
| 72 | C₂H₄O—C(O)PhNO₂ | C₂H₅ | H | CH₃ | 5-chloro-benzoxazolyl |
| 73 | C₂H₄O—C(O)PhOCH₃ | C₂H₅ | H | CH₃ | 5-chloro-benzoxazolyl |
| 74 | C₂H₄O—C(O)PhCl | C₂H₅ | H | CH₃ | 5-chloro-benzoxazolyl |
| 75 | C₂H₄O—C(O)PhOCH₃ | C₂H₅ | H | H | 5-phenyl-1,3,4-oxadiazolyl |
| 76 | " | C₂H₅ | H | CH₃ | benzothiazolyl |
| 77 | " | C₂H₅ | H | H | " |

Methine Dyestuffs of the Formula

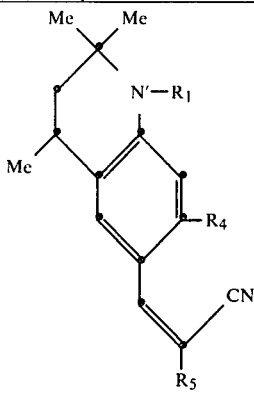

| Example | $R_1$ | $R_4$ | $R_5$ |
|---|---|---|---|
| 78 | $C_2H_4OCONHPh$ | H | 5-chloro-benzoxazolyl |
| 79 | $C_2H_4OCONHPh$ | $CH_3$ | 5-chloro-benzoxazolyl |
| 80 | $C_2H_4Cl$ | H | 5-chloro-benzoxazolyl |
| 81 | $C_2H_4OC_2H_5$ | H | 5-chloro-benzoxazolyl |
| 82 | $C_2H_4CN$ | H | 5-chloro-benzoxazolyl |
| 83 | $C_2H_4CN$ | $CH_3$ | 5-chloro-benzoxazolyl |
| 84 | $C_2H_4S$-benzothiazolyl | H | 5-chloro-benzoxazolyl |
| 85 | $C_2H_4O-\overset{O}{\underset{\|}{C}}C_4H_9$ | Br | 5-chloro-benzoxazolyl |
| 86 | $C_6H_5$ | H | 5-chloro-benzoxazolyl |
| 87 | $C_2H_4OCONHPh$ | Cl | 5-chloro-benzothiazolyl |
| 88 | $C_2H_4NHCONHPh$ | $CH_3$ | 5-chloro-benzothiazolyl |
| 89 | $C_2H_4OCH_3$ | H | 5-chloro-benzothiazolyl |
| 90 | $C_2H_4OC_2H_4OC_2H_5$ | $OCH_3$ | 5-chloro-benzothiazolyl |
| 91 | $C_2H_4CN$ | H | 5-chloro-benzothiazolyl |
| 92 | H | $CH_3$ | 5-chloro-benzothiazolyl |

-continued

Methine Dyestuffs of the Formula

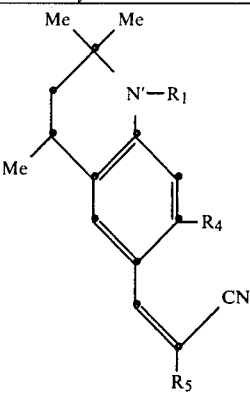

| Example | $R_1$ | $R_4$ | $R_5$ |
|---|---|---|---|
| 93 | $C_2H_4S$-benzothiazolyl | H | 5-chloro-benzothiazolyl |
| 94 | $CH_2-C_6H_5$ | Cl | 5-chloro-benzothiazolyl |
| 95 | $C_2H_5$ | H | 5-chloro-benzothiazolyl |
| 96 | $C_2H_4OCONHPh$ | H | 5-phenyl-1,3,4-oxadiazolyl |
| 97 | $C_2H_4OCONHPh$ | $CH_3$ | 5-phenyl-1,3,4-oxadiazolyl |
| 98 | $C_2H_4Cl$ | H | 5-phenyl-1,3,4-oxadiazolyl |
| 99 | $C_2H_4OC_2H_4OC_2H_5$ | H | 5-phenyl-1,3,4-oxadiazolyl |
| 100 | $C_2H_4CN$ | H | 5-phenyl-1,3,4-oxadiazolyl |
| 101 | $C_2H_4CN$ | $CH_3$ | 5-phenyl-1,3,4-oxadiazolyl |
| 102 | $C_2H_4S$-benzothiazolyl | H | 5-phenyl-1,3,4-oxadiazolyl |
| 103 | $C_2H_4-O-\overset{O}{\underset{\|}{C}}-C_2H_5$ | H | 5-phenyl-1,3,4-oxadiazolyl |
| 104 | $C_2H_5$ | H | 5-phenyl-1,3,4-oxadiazolyl |

The following table gives further examples and specifies the heterocyclic aldehyde which is reacted with the methylene active cyano compound.

| Example | Heterocyclic acetonitrile | Aldehyde |
|---|---|---|
| 105 | 3-Benzoisothiazolyl | 6-Formyl-N-ethyl-1,2,3,4-tetrahydro-2,2,4,7-tetramethylquinoline |
| 106 | " | 6-Formyl-N-($\beta$-mercaptobenzthiazolylethyl) 1,2,3,4-tetrahydro-2,2,4-trimethylquinoline |
| 107 | " | 4-Formyl-N,N-diethylaniline |
| 108 | " | 4-Formyl-N-ethyl-N-($\beta$-phthalimidoethyl)-m-toluidine |
| 109 | " | 4-Formyl-N,N-diethyl-m-toluidine |
| 110 | " | 4-Formyl-N,N-diethyl-m-chloroaniline |
| 111 | " | 4-Formyl-N-ethyl-N-($\beta$-chloroethyl) m-toluidine |
| 112 | " | 4-Formyl-N,N-diethyl-o-bromoaniline |
| 113 | " | 4-Formyl-N-ethyl-N-($\beta$-cyanoethyl)aniline |
| 114 | " | 4-Formyl-N-ethyl-N-($\beta$-succinimidoethyl)-m-toluidine |
| 115 | " | 4-Formyl-N-($\beta$-cyanoethyl)-N-($\beta$-succinimidoethyl)aniline |
| 116 | " | 4-Formyl-N,N-dibenzyl aniline |
| 117 | " | 4-Formyl-N-phenylthiomorpholinedioxide |

-continued

| Example | Heterocyclic acetonitrile | Aldehyde |
|---|---|---|
| 118 | 3-pyridyl | 6-Formyl-N-ethyl-1,2,3,4-tetrahydro-2,2,4,7-tetramethylquinoline |
| 119 | " | 6-Formyl-N-(β-mercaptobenzthiazolylethyl)1,2,3,4-tetrahydro-2,2,4-trimethylquinoline |
| 120 | " | 4-Formyl-N,N-diethylaniline |
| 121 | " | 4-Formyl-N-ethyl N-(β-phthalaimidoethyl)-m-toluidine |
| 122 | " | 4-Formyl-N,N-diethyl-m-toluidine |
| 123 | " | 4-Formyl-N,N-diethyl-m-chloroaniline |
| 124 | " | 4-Formyl-N-ethyl-N-(β-chloroethyl)m-toluidine |
| 125 | " | 4-Formyl-N,N-diethyl-o-bromoaniline |
| 126 | " | 4-Formyl-N-ethyl-N-(β-cyanoethyl)aniline |
| 127 | " | 4-Formyl-N-ethyl-N-(β-succinimidoethyl)-m-toluidine |
| 128 | " | 4-Formyl-N-(β-cyanoethyl)-N-(β-succinimidoethyl)-aniline |
| 129 | " | 4-Formyl-N,N-dibenzyl aniline |
| 130 | " | 4-Formyl-N-(β-acetoxyethyl)-N-ethylaniline |
| 131 | " | 4-Formyl-N-phenylthiomorpholinedioxide |
| 132 | 2-benzothiazolyl | 6-Formyl-N-ethyl-1,2,3,4-tetrahydro-2,2,4,7-tetramethylquinoline |
| 133 | " | 6-Formyl-N-(β-mercaptobenzthiazolylethyl)1,2,3,4-tetrahydro-2,2,4-trimethylquinoline |
| 134 | " | 4-Formyl-N,N-diethylaniline |
| 135 | " | 4-Formyl-N-ethyl-N-(β-phthalimidoethyl)-m-toluidine |
| 136 | " | 4-Formyl-N,N-diethyl-m-toluidine |
| 137 | " | 4-Formyl-N,N-diethyl-m-chloroaniline |
| 138 | " | 4-Formyl-N-ethyl-N-(β-chloroethyl)m-toluidine |
| 139 | " | 4-Formyl-N,N-diethyl-o-bromoaniline |
| 140 | " | 4-Formyl-N-ethyl-N-(β-cyanoethyl)aniline |
| 141 | " | 4-Formyl-N-ethyl-N-(β-succinimidoethyl)-m-toluidine |
| 142 | " | 4-Formyl-N-(β-cyanoethyl)-N-(β-succinimidoethyl)-aniline |
| 143 | " | 4-Formyl-N,N-dibenzyl aniline |
| 144 | " | 4-Formyl-N-(β-butyloxyethyl)-N-ethylaniline |
| 145 | " | 4-Formyl-N-phenylthiomorpholinedioxide |
| 146 | 2-benzoxazolyl | 6-Formyl-N-ethyl-1,2,3,4-tetrahydro-2,2,4,7-tetramethylquinoline |
| 147 | " | 6-Formyl-N-(β-mercaptobenzthiazolylethyl)1,2,3,4-tetrahydro-2,2,4-trimethylquinoline |
| 148 | " | 4-Formyl-N,N-diethylaniline |
| 149 | " | 4-Formyl-N-ethyl-N-(β-phthalimidoethyl)-m-toluidine |
| 150 | " | 4-Formyl-N,N-diethyl-m-toluidine |
| 151 | " | 4-Formyl-N,N-diethyl-m-chloroaniline |
| 152 | " | 4-Formyl-N-ethyl-N-(β-chloroethyl)m-toluidine |
| 153 | " | 4-Formyl-N,N-diethyl-o-bromoaniline |
| 154 | " | 4-Formyl-N-ethyl-N-(β-cyanoethyl)aniline |
| 155 | " | 4-Formyl-N-ethyl-N-(β-succinimidoethyl)-m-toluidine |
| 156 | " | 4-Formyl-N-(β-cyanoethyl)-N-(β-succinimidoethyl)-aniline |
| 157 | " | 4-Formyl-N,N-dibenzyl-aniline |
| 158 | " | 4-Formyl-N-(β-acetoxyethyl)-N-(β-succinimidoethyl)-m-toluidine |
| 159 | " | 4-Formyl-N-phenylthiomorpholinedioxide |
| 160 | " | 4-Formyl-N-(cyclohexyl)-N-(β-cyanoethyl)-m-toluidine |
| 161 | 2-quinoxalyl | 6-Formyl-N-ethyl-1,2,3,4-tetrahydro-2,2,4,7-tetramethylquinoline |
| 162 | " | 6-Formyl-N-(β-mercaptobenzthiazolylethyl)1,2,3,4-tetrahydro-2,2,4-trimethylquinoline |
| 163 | " | 4-Formyl-N,N-diethylaniline |
| 164 | " | 4-Formyl-N-ethyl-N-(β-phthalimidoethyl)-m-toluidine |
| 165 | " | 4-Formyl-N,N-diethyl-m-toluidine |
| 166 | " | 4-Formyl-N,N-diethyl-m-chloroaniline |
| 167 | " | 4-Formyl-N-ethyl-N-(β-chloroethyl) |

-continued

| Example | Heterocyclic acetonitrile | Aldehyde |
|---|---|---|
| | | m-toluidine |
| 168 | " | 4-Formyl-N,N-diethyl-o-bromoaniline |
| 169 | " | 4-Formyl-N-ethyl-N-(β-cyanoethyl)aniline |
| 170 | " | 4-Formyl-N-ethyl-N-(β-succinimidoethyl)-m-toluidine |
| 171 | " | 4-Formyl-N-(β-cyanoethyl)-N-(β-succinimidoethyl)-aniline |
| 172 | " | 4-Formyl-N,N-dibenzyl aniline |
| 173 | " | 4-Formyl-N-(β-acetoxyethyl)-N-(β-succinimidoethyl)-m-toluidine |
| 174 | " | 4-Formyl-N-phenylthiomorpholinedioxide |
| 175 | " | 4-Formyl-N-(cyclohexyl)-N-(β-cyanoethyl)-m-toluidine |
| 176 | 2-quinazolinonyl | 6-Formyl-N-ethyl-1,2,3,4-tetrahydro-2,2,4,7-tetramethylquinoline |
| 177 | " | 6-Formyl-N-(β-mercaptobenzthiazolylethyl) 1,2,3,4-tetrahydro-2,2,4-trimethylquinoline |
| 178 | " | 4-Formyl-N,N-diethylaniline |
| 179 | " | 4-Formyl-N-ethyl-N-(β-phthalimidoethyl)-m-toluidine |
| 180 | " | 4-Formyl-N,N-diethyl-m-toluidine |
| 181 | " | 4-Formyl-N,N-diethyl-m-chloroaniline |
| 182 | " | 4-Formyl-N-ethyl-N-(β-chloroethyl)m-toluidine |
| 183 | " | 4-Formyl-N,N-diethyl-o-bromoaniline |
| 184 | " | 4-Formyl-N-ethyl-N-(β-cyanoethyl)aniline |
| 185 | " | 4-Formyl-N-ethyl-N-(β-succinimidoethyl)-m-toluidine |
| 186 | " | 4-Formyl-N-(β-cyanoethyl)-N-(β-succinimidoethyl)-aniline |
| 187 | " | 4-Formyl-N,N-dibenzyl aniline |
| 188 | " | 4-Formyl-N-(β-acetoxyethyl)-N-(β-succinimidoethyl)-m-toluidine |
| 189 | " | 4-Formyl-N-phenylthiomorpholinedioxide |
| 190 | " | 4-Formyl-N-(cyclohexyl)-N-(β-cyanoethyl)-m-toluidine |
| 191 | 2-1,3,4-oxadiazolyl | 6-Formyl-N-ethyl-1,2,3,4-tetrahydro-2,2,4,7-tetramethylquinoline |
| 192 | " | 6-Formyl-N-(β-mercaptobenzthiazolylethyl) 1,2,3,4-tetrahydro-2,2,4-trimethylquinoline |
| 193 | " | 4-Formyl-N,N-diethylaniline |
| 194 | " | 4-Formyl-N-ethyl-N-(β-phthalimidoethyl)-m-toluidine |
| 196 | " | 4-Formyl-N,N-diethyl-m-chloroaniline |
| 197 | " | 4-Formyl-N-ethyl-N-(β-chloroethyl)m-toluidine |
| 198 | " | 4-Formyl-N,N-diethyl-o-bromoaniline |
| 199 | " | 4-Formyl-N-ethyl-N-(β-cyanoethyl)aniline |
| 200 | " | 4-Formyl-N-ethyl-N-(β-succinimidoethyl)-m-toluidine |
| 201 | " | 4-Formyl-N-(β-cyanoethyl)-N-(β-succinimidoethyl)-aniline |
| 202 | " | 4-Formyl-N,N-dibenzyl aniline |
| 203 | " | 4-Formyl-N-(β-acetoxyethyl)-N-(β-succinimidoethyl)-m-toluidine |
| 204 | " | 4-Formyl-N-phenylthiomorpholinedioxide |
| 205 | " | 4-Formyl-N-(cyclohexyl)-N-(β-cyanoethyl)-m-toluidine |
| 206 | 2-1,3,4-thiadiazolyl | 6-Formyl-N-ethyl-1,2,3,4-tetrahydro-2,2,4,7-tetramethylquinoline |
| 207 | " | 6-Formyl-N-(β-mercaptobenzthiazolylethyl) 1,2,3,4-tetrahydro-2,2,4-trimethylquinoline |
| 208 | " | 4-Formyl-N,N-diethylaniline |
| 209 | " | 4-Formyl-N-ethyl-N-(β-phthalimidoethyl)-m-toluidine |
| 210 | " | 4-Formyl-N,N-diethyl-m-toluidine |
| 211 | " | 4-Formyl-N,N-diethyl-m-chloroaniline |
| 212 | " | 4-Formyl-N-ethyl-N-(β-chloroethyl)m-toluidine |
| 213 | " | 4-Formyl-N,N-diethyl-o-bromoaniline |
| 214 | " | 4-Formyl-N-ethyl-N-(β-cyanoethyl)aniline |
| 215 | " | 4-Formyl-N-ethyl-N-(β-succinimidoethyl)-m-toluidine |

-continued

| Example | Heterocyclic acetonitrile | Aldehyde |
|---|---|---|
| 216 | " | 4-Formyl-N-(β-cyanoethyl)-N-(β-succinimidoethyl)-aniline |
| 217 | " | 4-Formyl-N,N-dibenzyl aniline |
| 218 | " | 4-Formyl-N-(β-acetoxyethyl)-N-(β-succinimidoethyl)-m-toluidine |
| 219 | " | 4-Formyl-N-phenylthiomorpholinedioxide |
| 220 | " | 4-Formyl-N-(cyclohexyl)-N-(β-cyanoethyl)-m-toluidine |
| 221 | 2-thienyl | 6-Formyl-N-ethyl-1,2,3,4-tetrahydro-2,2,4,7-tetramethylquinoline |
| 222 | " | 6-Formyl-N-(β-mercaptobenzthiazolylethyl) 1,2,3,4-tetrahydro-2,2,4-trimethylquinoline |
| 223 | " | 4-Formyl-N,N-diethylaniline |
| 224 | " | 4-Formyl-N-ethyl-N-(β-phthalimidoethyl)-m-toluidine |
| 225 | " | 4-Formyl-N,N-diethyl-m-toluidine |
| 226 | " | 4-Formyl-N,N-diethyl-m-chloroaniline |
| 227 | " | 4-Formyl-N-ethyl-N-(β-chloroethyl) m-toluidine |
| 228 | " | 4-Formyl-N,N-diethyl-o-bromoaniline |
| 229 | " | 4-Formyl-N-ethyl-N-(β-cyanoethyl)aniline |
| 230 | " | 4-Formyl-N-ethyl-N-(β-succinimidoethyl)-m-toluidine |
| 231 | " | 4-Formyl-N-(β-cyanoethyl)-N-(β-succinimidoethyl)-aniline |
| 232 | " | 4-Formyl-N,N-dibenzyl ailine |
| 233 | " | 4-Formyl-N-(β-acetoxyethyl)-N-(β-succinimidoethyl)-m-toluidine |
| 234 | " | 4-Formyl-N-phenylthiomorpholinedioxide |
| 235 | " | 4-Formyl-N-(cyclohexyl)-N-(β-cyanoethyl)-m-toluidine |

The invention has been described in detail with particular reference to preferred embodiments thereof, but it will be understood that variations and modifications can be effected within the spirit and scope of the invention.

I claim:

1. A compound of the formula

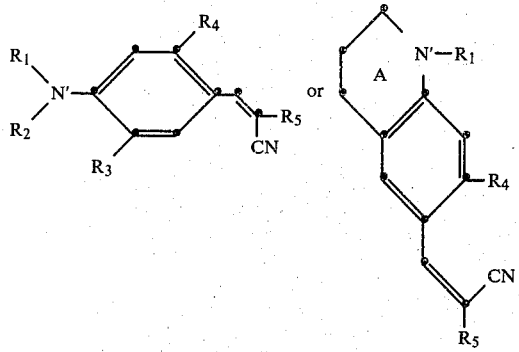

in which $R_1$ and $R_2$ are the same or different and selected from hydrogen, aryl, benzyl, cyclohexyl, $C_1$–$C_6$ alkyl, $C_1$–$C_6$ alkyl substituted with Cl, CN, $OC_2H_4OC_2H_5$, $C_1$–$C_4$ alkoxy, aryl,

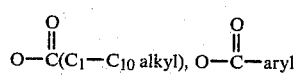

in which the aryl, and the $C_1$–$C_{10}$ alkyl of the preceding substituent are unsubstituted or substituted with Cl, Br, CN, $NO_2$, CO—alkyl, CO—aryl, alkoxy, aryloxy, CO—O—alkyl or CO—O—aryl, $$-\overset{O}{\underset{\|}{C}}-O(C_1-C_{10}\ alkyl),$$

NHCONHPh, OCONHPh, phthalimido, succinimido and mercaptobenzothiazolyl;

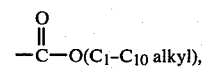

is selected from piperidino, morpholino, thiomorpholino, and piperazino; $R_3$ is H, Cl, Br, $C_1$–$C_4$ alkyl or $C_1$–$C_4$ alkoxy; ring A is unsubstituted or substituted with 1–3 methyl groups; $R_4$ is H, Cl, Br, $C_1$–$C_4$ alkyl or $C_1$–$C_4$ alkoxy; and $R_5$ is selected from 3-benzisothiazolyl, 2-benzothiazolyl, 2-benzoxazolyl, 2-quinoxalyl, 2-quinazolinonyl, 2-1,3,4-oxadiazolyl, 2-1,3,4-thiadiazolyl, and these heterocycles substituted with Cl, Br, $NO_2$, CN, aryl, aryl substituted with Cl, Br, $NO_2$, or CN, $C_1$–$C_4$ alkyl, or $COOR_6$ wherein $R_6$ is $C_1$–$C_4$ alkyl or aryl.

2. A compound according to claim 1 having the formula

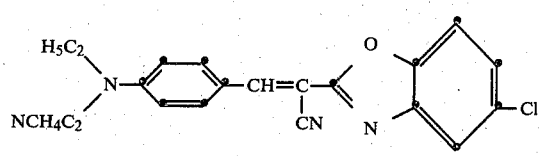

3. A compound according to claim 1 having the formula

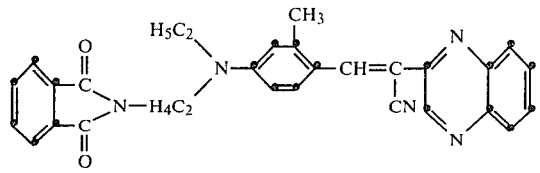
4. A compound according to claim 1 having the formula
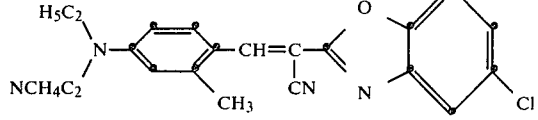
5. A compound according to claim 1 having the formula
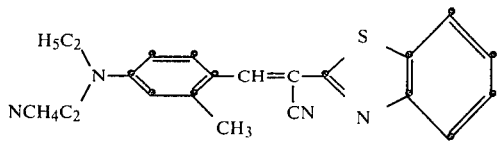
6. A compound according to claim 1 having the formula
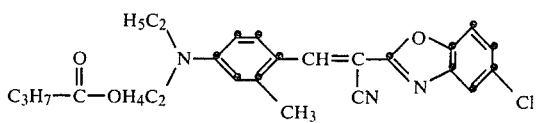
* * * * *